United States Patent
Jeong et al.

(10) Patent No.: US 8,456,696 B2
(45) Date of Patent: Jun. 4, 2013

(54) PRINTING CONTROL METHOD, PRINTING CONTROL TERMINAL DEVICE AND IMAGE FORMING APPARATUS TO SELECTIVELY CONVERT A PORTION OF AN XPS FILE TO PDL DATA

(75) Inventors: Tae-woon Jeong, Suwon-si (KR); Young-soo Han, Yongin-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 616 days.

(21) Appl. No.: 12/469,855

(22) Filed: May 21, 2009

(65) Prior Publication Data

US 2010/0053670 A1 Mar. 4, 2010

(30) Foreign Application Priority Data

Sep. 3, 2008 (KR) .............................. 2008-0086987

(51) Int. Cl.
 *G06F 15/00* (2006.01)
 *G06F 3/12* (2006.01)
 *G06K 1/00* (2006.01)
 *H04N 1/60* (2006.01)
(52) U.S. Cl.
 USPC .......................... 358/1.9; 358/1.13; 358/1.15
(58) Field of Classification Search
 None
 See application file for complete search history.

(56) References Cited

U.S. PATENT DOCUMENTS

| | | | |
|---|---|---|---|
| 2005/0168773 A1* | 8/2005 | Kim | 358/1.15 |
| 2005/0213143 A1* | 9/2005 | Cook et al. | 358/1.15 |
| 2006/0274345 A1 | 12/2006 | Ferlitsch | |
| 2008/0024802 A1* | 1/2008 | Kato | 358/1.9 |
| 2008/0178067 A1 | 7/2008 | Lahman et al. | |
| 2008/0225310 A1* | 9/2008 | Huang | 358/1.9 |
| 2009/0097047 A1* | 4/2009 | Mitsui | 358/1.9 |
| 2009/0244628 A1* | 10/2009 | Tsugimura | 358/2.1 |

OTHER PUBLICATIONS

Microsoft XML Paper Specification version 1.0 <http://msdn.microsoft.com/en-us/windows/hardware/gg463431> Oct. 18, 2006. pp. 12, 45-46.*
Extended European Search Report dated Oct. 31, 2012 issued in EP Application No. 09167387.1.

* cited by examiner

*Primary Examiner* — Ming Hon
(74) *Attorney, Agent, or Firm* — Stanzione & Kim, LLP (57) ABSTRACT

A printing control method including receiving a command to print an XML paper specification (XPS) file; determining whether the XPS file contains a preset tag; separating a page to which the preset tag is attached from the XPS file, and converting the separated page into page description language (PDL) data; and transmitting the XPS file from which the page has been separated and the PDL data to an image forming apparatus, and a printing control terminal device and an image forming apparatus to execute the printing control method.

23 Claims, 4 Drawing Sheets

<transparency check Tag>

-Canvas. Opacity Mask
-Path. Opacity Mask
-Glyphs. Opacity Mask

FIG. 6

PRINTING CONTROL METHOD, PRINTING CONTROL TERMINAL DEVICE AND IMAGE FORMING APPARATUS TO SELECTIVELY CONVERT A PORTION OF AN XPS FILE TO PDL DATA

CROSS-REFERENCE TO RELATED APPLICATIONS

This application claims priority under 35 U.S.C. §119 (a) from Korean Patent Application No. 10-2008-0086987, filed on Sep. 3, 2008, in the Korean Intellectual Property Office, the disclosure of which is incorporated herein by reference in its entirety.

BACKGROUND

1. Field of the Invention

The present general inventive concept relates to a printing control method, a printing control terminal device and an image forming apparatus. More particularly, the present general inventive concept relates to a printing control method to convert a page of an XML paper specification (XPS) file having settings which require processing using many resources by an image forming apparatus, into page description language (PDL) data. The present general inventive concept also relates to a printing control terminal device and image forming apparatus using the method.

2. Description of the Related Art

Image forming apparatuses generally print print data generated by terminal devices, such as computers, onto recording media. Examples of such image forming apparatuses include copiers, printers, facsimile machines or multifunction peripherals (MFPs) which combine functions of copiers, printers and facsimile machines into a single system.

Image forming apparatuses which have been widely used in recent years have XPS emulators so as to support a function of printing XPS files, in addition to a conventional function of printing print data written in a page description language (PDL), such as postscript (PS) or printer command language (PCL).

An XPS file has a fixed-layout electronic file format that preserves document formatting and can be shared, and refers to a zip-formatted file which includes all kinds of data and resources described by systematizing all resources required for documents or operations in a directory structure and by writing the references therebetween in XML. Such an XPS file has a logical structure in the form of a tree having a plurality of levels, as illustrated in FIG. 6.

Figure 6:
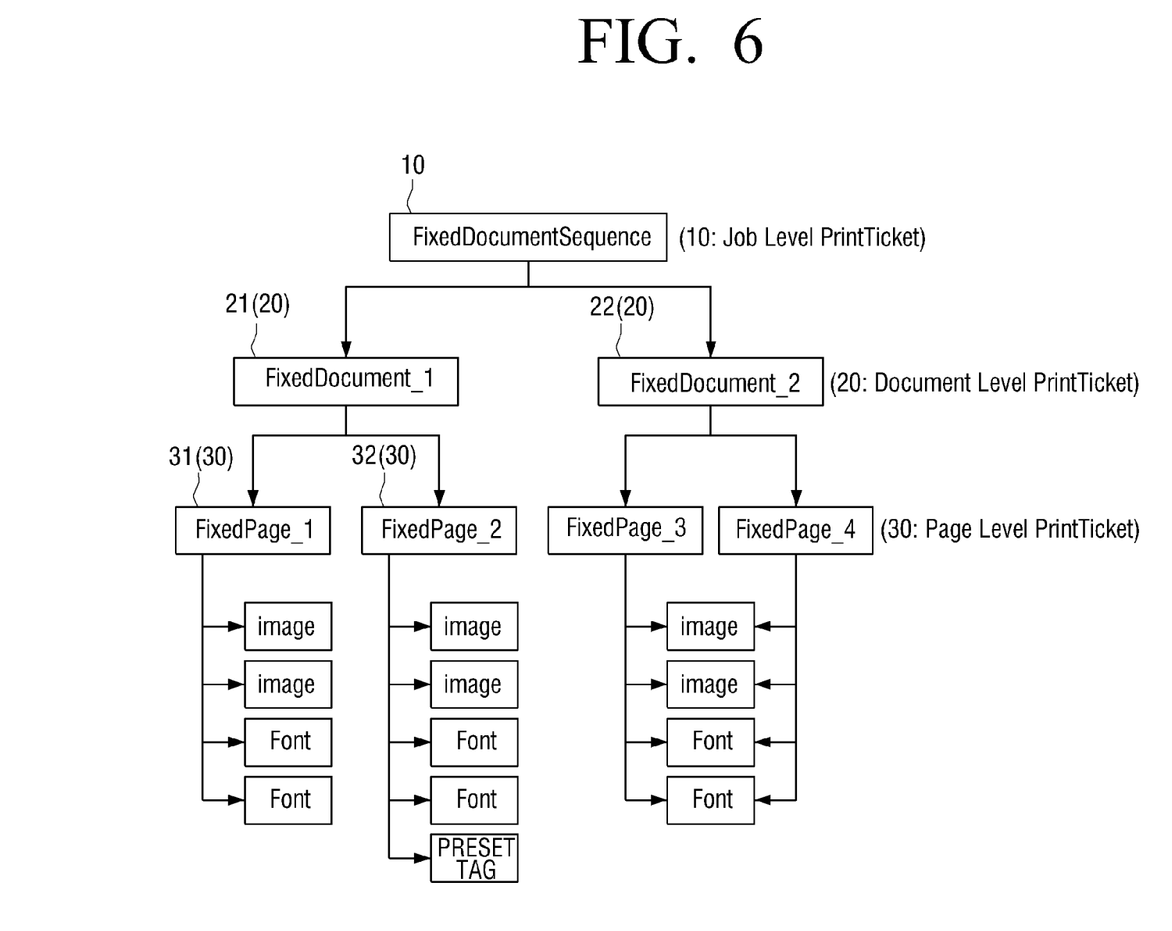
FIG. 6 illustrates a logical structure of XML paper specification (XPS) file.

Referring to FIG. 6, an XPS file is represented with a job level 10, a document level 20 and a page level 30 located in a hierarchical branching structure. The document level 20 includes a plurality of documents, and the page level 30 includes a plurality of pages. Different print options may be set to each of the plurality of documents and to each of the plurality of pages.

However, when processing an XPS file, an image forming apparatus requires greater resources when compared with a situation when processing data written in PDL. For example, if an XPS file contains transparency, an image forming apparatus may require greater resources in order to print the XPS file, thereby increasing the likelihood that problems may arise during printing.

SUMMARY

The present general inventive concept provides a printing control method and a printing control terminal device and image forming apparatus using the method, in which a page of an XML paper specification (XPS) file, having settings which require processing using many resources by an image forming apparatus, is converted into page description language (PDL) data.

Additional features and utilities of the present general inventive concept will be set forth in part in the description which follows and, in part, will be obvious from the description, or may be learned by practice of the general inventive concept.

Embodiments and utilities of the present general inventive concept can be achieved by providing a printing control method including receiving a command to print an XML paper specification (XPS) file, determining whether at least one page of the XPS file contains a preset tag, separating the at least one page to which the preset tag is attached from the XPS file, converting the at least one separated page into page description language (PDL) data, and transmitting the XPS file from which the at least one page has been separated and the PDL data to an image forming apparatus.

The preset tag may be associated with a transparency setting of the page.

The preset tag may be at least one of "Canvas.OpacityMask", "Path.OpacityMask" and "Glyphs.OpacityMask".

The determining operation may include searching for a "FixedPage" data area of the XPS file, and determining whether the "FixedPage" data area contains the preset tag.

The printing control method may further include dividing the XPS file from which the page has been separated, based on a position of the page.

The transmitting operation may include transmitting the divided XPS file and the PDL data to the image forming apparatus in the same page order as the original XPS file.

The printing control method may further include asking a user whether to perform the operation of determining whether the XPS file contains the preset tag.

The printing control method may further include determining whether the image forming apparatus includes a PDL emulator; and if the image forming apparatus does not include the PDL emulator, displaying a notification of absence of the PDL emulator.

Embodiments and utilities of the present general inventive concept can also be achieved by providing a printing control terminal device including a storage unit to store an XML paper specification (XPS) file, a user interface unit to receive a command to print the XPS file, a driver unit to determine whether at least one page of the XPS file contains a preset tag to separate the at least one page to which the preset tag is attached from the XPS file and to convert the at least one separated page into page description language (PDL) data, and a control unit to transmit the XPS file from which the page has been separated and the PDL data to an image forming apparatus.

The preset tag may be associated with a transparency setting of the page.

The preset tag may be at least one of "Canvas.OpacityMask", "Path.OpacityMask" and "Glyphs.OpacityMask".

The driver unit may search for a "FixedPage" data area of the XPS file, and determine whether the "FixedPage" data area contains the preset tag.

The driver unit may further include a search unit to determine whether the XPS file contains the preset tag; a separation unit to separate the page to which the preset tag is attached from the XPS file; and a PDL generation unit to generate PDL data using the separated page.

The PDL generation unit may render the separated page and generate PDL data using the rendered page.

The separation unit may divide the XPS file from which the page has been separated, based on a position of the page.

The control unit may transmit the divided XPS file and the PDL data to the image forming apparatus in the same page order as the original XPS file.

The user interface unit may ask a user whether to perform the operation of determining whether the XPS file contains the preset tag. The driver unit may determine whether the XPS file contains the preset tag according to selection by the user.

The printing control terminal device may further include a communication interface unit to determine whether the image forming apparatus includes a PDL emulator. If the image forming apparatus does not include the PDL emulator, the user interface unit may display a notification of absence of the PDL emulator.

Embodiments and utilities of the present general inventive concept can also be achieved by providing an image forming apparatus including a communication interface unit to receive an XML paper specification (XPS) file; an emulation unit to determine whether at least one page of the XPS file contains a preset tag, to separate the at least one page to which the preset tag is attached from the XPS file, and to convert the at least one separated page into page description language (PDL) data; and a control unit to print the XPS file from which the page has been separated and the PDL data.

The preset tag may be associated with a transparency setting of the page.

The emulation unit may search for a "FixedPage" data area from the XPS file, and determine whether the "FixedPage" data area contains the preset tag.

Embodiments and utilities of the present general inventive concept can also be achieved by providing an image forming apparatus including, an emulation unit to convert at least one page to which a preset tag is attached in an XPS file into PDL data according to the preset tag of the XPS file, and a control unit to print the PDL data and the XPS file of which at least one page has been converted into PDL data.

BRIEF DESCRIPTION OF THE DRAWINGS

The above and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
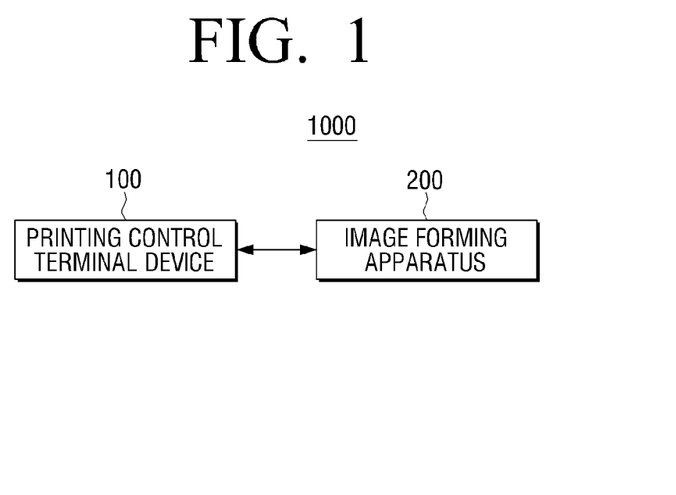
FIG. 1 illustrates a block diagram of a printing control system according to an exemplary embodiment of the present general inventive concept.

FIG. 1 illustrates a block diagram of a printing control system 1000 according to an exemplary embodiment of the present general inventive concept. In FIG. 1, the printing control system 1000 includes a printing control terminal device 100 and an image forming apparatus 200.

If an XML paper specification (XPS) file, which includes at least one page, contains a preset tag, the printing control terminal device 100 separates a page with the preset tag from the XPS file, converts the separated page into page description language (PDL) data, and transfers the XPS file from which the preset tag has been removed and the PDL data to the image forming apparatus 200. The configuration and operations of the printing control terminal device 100 is now described in detail with reference to FIG. 2.

Figure 2:
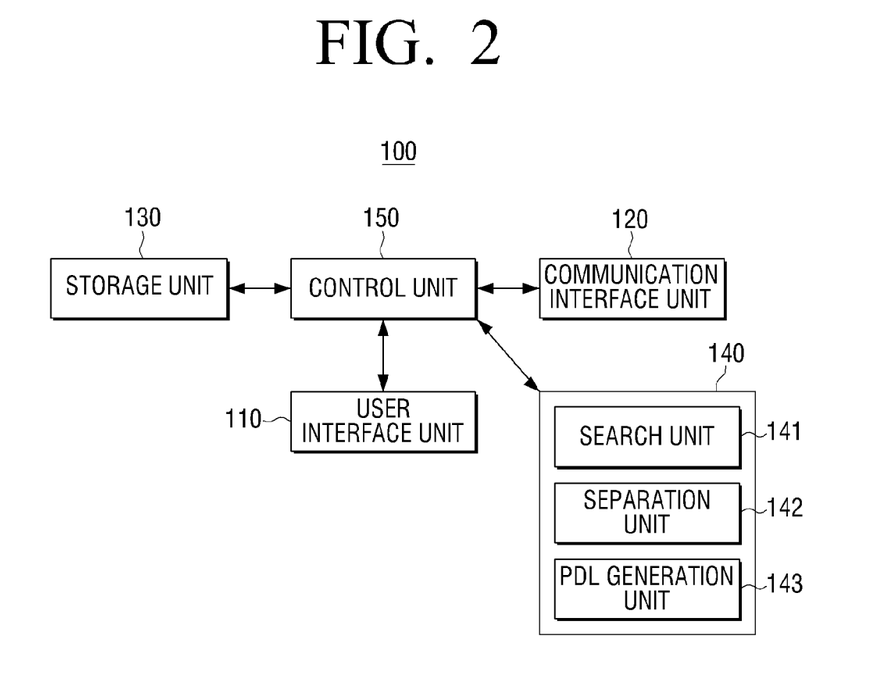
FIG. 2 illustrates a block diagram of a printing control terminal device according to an exemplary embodiment of the present general inventive concept.

FIG. 2 illustrates a block diagram of the printing control terminal device 100 according to an exemplary embodiment of the present general inventive concept. The printing control terminal device 100 of FIG. 2 includes a user interface unit 110, a communication interface unit 120, a storage unit 130, a driver unit 140 and a control unit 150.

The user interface unit 110 includes a plurality of function keys through which a user is able to set or select various functions supported by the printing control terminal device 100. The user interface unit 110 displays a variety of information provided by the printing control terminal device 100. The user interface unit 110 may be implemented as an apparatus such as a touch pad which is able to simultaneously implement input and output, as an apparatus combining a mouse and a monitor, etc. A user may select an XPS file to print using a user interface window provided by the user interface unit 110, and may decide whether to perform an operation of checking whether a predetermined tag exists, which is described below.

Here, the XPS file, as described above, refers to print data for which print options are set, and which is represented in the form of a hierarchical tree structure having a plurality of levels connected to corresponding nodes. Specifically, the XPS file has a plurality of levels each having one or more nodes, and different print options may be set for each node of the plurality of levels. The first level has only one node and may be called a "root node." A second level of nodes may be referred to as the "children" of the "root node." Additionally, a third level of nodes may be referred to as the "children" of the second level, or "grandchildren" of the "root node."

Referring to FIG. 6, an exemplary XPS file is represented as having a job level (Job Level PrintTicket) 10, a document level (Document Level PrintTicket) 20 and a page level (Page Level PrintTicket) 30 located in a hierarchical branching structure. Different print options may be set for each of a plurality of documents at the document level 20 and for each of a plurality of pages at the page level 30. For example, a "double-sided printing" option may be set for the job level 10; a "2-up" option may be set for a first document 21 of the document level 20; an "A4 paper" option may be set for a first page 31 of the first document 21; and an "A5 paper" option may be set for a second page 32 of the first document 21. In this example, the print options set for the respective nodes of the tree are available at lower levels. In other words, when a print option is set for a node, the set option applies to all the "children", "grandchildren", etc., that originage from the node to which the print option is set. For example, if a "double-sided printing" option is set for a first document 21 of the document level 20, the "double-sided printing" option will apply to all pages of the first document 21, including first page 31, second page 32, etc.

The communication interface unit 120 is connected to the image forming apparatus 200, and provides the image forming apparatus 200 with print data formatted to be processed by the image forming apparatus 200. Here, the print data may include, for example, PDL data written in postscript (PS) or in printer command language (PCL), and an XPS file. The PDL data of the print data may include a preset tag and/or a page with a preset tag attached thereto. The printing control terminal device 100 may be configured to communicate with an external apparatus as well as the image forming apparatus 200, and may be implemented as a parallel port, a universal serial bus (USB) port, a wireless module, and the like.

The storage unit 130 stores an XPS file represented as having a tree structure having a plurality of levels for which print options are set. The storage unit 130 also stores an XPS file and PDL data which may be generated by the following operations. Additionally, the storage unit 130 may be implemented as an external storage medium separated from the printing control terminal device 100. For example, the storage unit 130 may be implemented as a USB memory outside the printing control terminal device 100.

Referring to FIG. 2, the driver unit 140 may refer to an XPS printer driver to perform operations for an XPS file. The driver unit 140 controls print options set by a user to be applied, and controls various filters in an XPS print filter pipeline to perform preprocessing on an XPS file.

Additionally, the driver unit 140 determines whether the XPS file contains a preset tag. For example, as illustrated in FIG. 6, the second page 32 of the first document 21 may include a preset tag. If it is determined by the driver unit 140 that the XPS file contains the preset tag, the driver unit 140 may remove the preset tag from the XPS file and converts the preset tag into PDL data. Additionally, the driver unit 140 may remove a page or pages to which the preset tag may be attached from the XPS file and convert the page(s) into PDL data. Alternatively, the driver unit 140 may simultaneously remove the preset tag and page(s) to which the preset tag is attached from the XPS file and convert the preset tag and page(s) into PDL data. The driver unit 140 includes a search unit 141, a separation unit 142 and a PDL generation unit 143. The search unit 141, the separation unit 142 and the PDL generation unit 143 may be implemented in the form of filters in an XPS print filter pipeline of the XPS printer driver.

Figure 4:
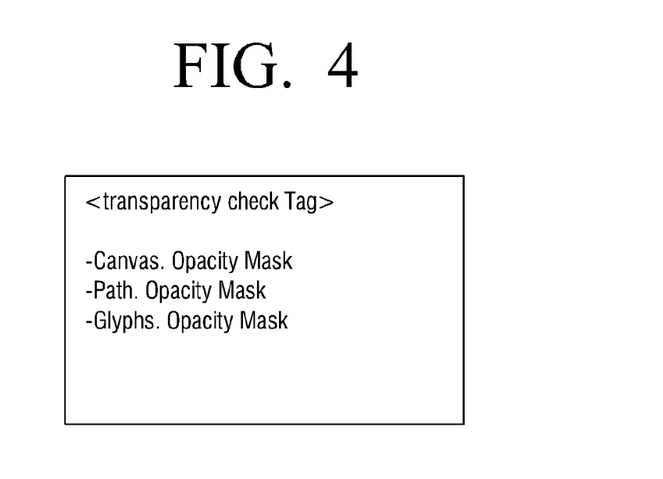
FIG. 4 illustrates a preset tag according to an exemplary embodiment of the present general inventive concept.

The search unit 141 determines whether the XPS file contains a preset tag. Specifically, the search unit 141 reads data containing a variety of settings regarding the XPS file, and checks whether the read data has settings, such as transparency, which require many resources when being processed by an image forming apparatus. In this case, the transparency setting of the XPS file may be defined by a tag, and the tag may be described in a "FixedPage" data area of the XPS file. Examples of the tag associated with the transparency setting are illustrated in FIG. 4. Accordingly, the search unit 141 searches for tags such as "Canvas.OpacityMask", "Path.OpacityMask" and "Glyphs.OpacityMask" from the "FixedPage" data area of the XPS file, and determines whether the XPS file includes a transparency setting. While the tag associated with the transparency setting has been exemplified in the exemplary embodiment of the present general inventive concept, the preset tag may be tags associated with other settings for which processing requires a memory capacity exceeding a resource threshold of an image forming apparatus.

Additionally, if it is determined that the XPS file contains the preset tag, the search unit 141 searches for a page to which the preset tag is attached, and transfers information on the page found as a result of a search by the search unit 141 to the separation unit 142. The search unit 141 may be implemented in the form of a filter in an XPS print filter pipeline of an XPS printer driver.

The separation unit 142 separates the page to which the preset tag is attached from the XPS file using the information on the page received from the search unit 141. For example, if a preset tag is attached to page 5 of an XPS file including pages 1 to 10, the separation unit 142 may extract data corresponding to page 5 from the XPS file, and may transfer the extracted data to the PDL generation unit 143 so that the data corresponding to page 5 may be converted into PDL data. After transferring the extracted data to the PDL generation unit 143, the separation unit 142 may remove the data corresponding to page 5 from the XPS file. While a page to which the preset tag is attached is removed from the XPS file by deleting data representing the page to which the preset tag is attached in this exemplary embodiment, the present general inventive concept can also be applied to a situation in which a print range option for notifying that the page containing the preset tag does not correspond to print data is additionally set to the XPS file in order to remove the preset tag.

Additionally, the separation unit 142 divides the XPS file, from which the page with the preset tag has been removed, into a plurality of pieces of data. Specifically, the XPS file is divided into a plurality of pieces of data to be printed by an image forming apparatus in the same page order as the original XPS file. For example, if a preset tag is attached to page 5 of an XPS file including pages 1 to 10, the separation unit 142 may separate page 5 from the XPS file, may transfer the separated page 5 to the PDL generation unit 143, and may then divide the XPS file, from which page 5 has been separated, into a first XPS file corresponding to pages 1 to 4 and a second XPS file corresponding to pages 6 to 10. Additionally, if an XPS file includes pages 1 to 10, and a preset tag is attached to pages 3 and 7 of the XPS file, the separation unit may separate pages 3 and 7 from the XPS file, and may then divide the XPS file, from which pages 3 and 7 have been separated, into a first XPS file corresponding to pages 1 to 2, a second XPS file corresponding to pages 4 to 6, and a third XPS file corresponding to pages 8 to 10. The separation unit 142 may divide the XPS file into any number of pieces of data, and is not limited to the examples provided herein.

The PDL generation unit 143 converts a page to which the preset tag is attached into PDL data. Specifically, the PDL generation unit 143 performs rendering on the page with the preset tag received from the separation unit 142, and converts the rendered page into PDL data, such as PCL data or PS data.

The control unit 150 transmits the XPS file from which the page with the preset tag has been separated and the PDL data to the image forming apparatus 200. In more detail, the control unit 150 controls the communication interface unit 120 to transmit the XPS file from which the page with the preset tag has been separated by the separation unit 142, along with the PDL data generated by the PDL generation unit 143 to the image forming apparatus 200.

In this example, the control unit 150 transmits the plurality of pieces of data obtained by dividing the XPS file and the PDL data in the order of pages to the image forming apparatus 200. The order of pages is the same as that of the original XPS file. For example, if a preset tag is attached to page 5 of an XPS file including pages 1 to 10, the control unit 150 may sequentially transmit the first XPS file corresponding to pages 1 to 4, the PDL data corresponding to page 5, and the second XPS file corresponding to pages 6 to 10 to the image forming apparatus 200. Additionally, if an XPS file includes pages 1 to 10, and a preset tag is attached to pages 3 and 7 of the XPS file, the control unit 150 may sequentially transmit the first XPS file corresponding to pages 1 to 2, the first PDL data corresponding to page 3, the second XPS file corresponding to pages 4 to 6, the second PDL data corresponding to page 7, and the third XPS file corresponding to pages 8 to 10.

The control unit 150 receives user settings from user interface 110 to determine whether to perform the above-described process. Additionally, the user may determine whether to perform the above-described process during initial setting or after a preset tag is detected. For example, a user may set the printing control terminal device 100 to automatically remove all preset tags from an XPS file that has been selected to print. Additionally, a user may set the printing control terminal device 100 to automatically remove only specific preset tags from an XPS file that has been selected to print. For example, if an XPS file includes a transparency setting, a user may set the printing control terminal device 100 to automatically remove only a "Canvas.OpacityMask" tag, and not a "Path.OpacityMask" tag or a "Glyphs.OpacityMask" tag. Additionally, a user may set the printing control terminal device 100 to automatically remove only one type of preset tags from an XPS file that has been selected to print, such as a transparency setting. A user may also set the printing control terminal device 100 to await user instructions before processing an XPS file that has been selected to print, so a user may manually set printing options. A user may also set the printing control terminal device 100 to automatically process the XPS file, by removing some or all preset tags or not removing any preset tags, after a predetermined period of time of waiting for a user's instructions. A user may also set a print range of an XPS file, where if an XPS file is 20 pages, a user may select only pages 1 to 8 to print.

The control unit 150 checks whether the image forming apparatus 200 includes a PDL emulator. Specifically, the control unit 150 controls the communication interface unit 120 to check whether the image forming apparatus 200 includes a PDL emulator. If the image forming apparatus 200 includes the PDL emulator, the control unit 150 may cause the above-described process to be performed. If the image forming apparatus 200 does not include a PDL emulator, the control unit 150 may control the user interface unit 110 to notify a user that the image forming apparatus 200 cannot to convert a current XPS file into PDL data.

Accordingly, the printing control terminal device 100 may determine whether an XPS file includes settings, such as transparency, which require processing that uses excessive resources of an image forming apparatus. If it is determined that a page of the XPS file is set as transparent, the printing control terminal device 100 may convert the page with the transparency into PDL data, and may transmit the PDL data to the image forming apparatus. Thus, an image forming apparatus with limited resources may also easily print the XPS file.

The image forming apparatus 200 receives print data, for example, a XPS file and PDL data, from the printing control terminal device 100, and prints the received print data. Specifically, the image forming apparatus 200 includes an XPS emulator to process XPS files to be printed, and a PDL emulator to process PDL data to be printed, so as to print the XPS files and PDL data received from the printing control terminal device 100.

The image forming apparatus 200 may process an XPS file, and may itself perform the operations described above as being performed by the printing control terminal device 100.

Such an image forming apparatus 200 is now described in detail with reference to FIG. 3.

Figure 3:
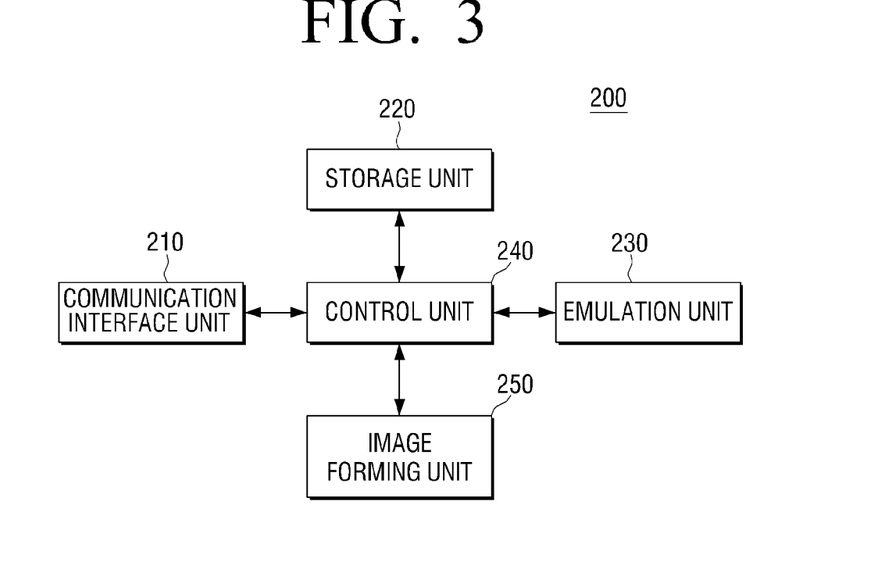
FIG. 3 illustrates a block diagram of an image forming apparatus according to an exemplary embodiment of the present general inventive concept.

FIG. 3 illustrates a block diagram of the image forming apparatus 200 according to an exemplary embodiment of the present general inventive concept. The image forming apparatus 200 of FIG. 3 includes a communication interface unit 210, a storage unit 220, an emulation unit 230 and a control unit 240.

The communication interface unit 210 is connected to the printing control terminal device 100 to receive an XPS file. Specifically, the communication interface unit 210 enables the image forming apparatus 200 to be connected to an external apparatus. The communication interface unit 210 may be connected to the printing control terminal device 100 via a local area network (LAN) or Internet network, a USB port, and the like.

As illustrated in FIG. 1, the printing control terminal device 100 and the image forming apparatus 200 may be connected. For example, the communication interface unit 120 of the printing control terminal device 100 and the communication interface unit 210 of the image forming apparatus may be connected via a local area network (LAN), an Internet network, a USB port, and the like. The communication interface unit 120 of the printing control terminal device 100 may transmit print data to the communication interface unit 210 of the image forming apparatus 200. The print data may include, for example, PDL data written in postscript (PS) or in printer command language (PCL), and any number of XPS files.

The storage unit 220 stores the XPS file received from the printing control terminal device 100 via the communication interface unit 210. The storage unit 220 may be implemented as an external storage medium separated from the image forming apparatus 200, for example a USB memory outside the image forming apparatus 200.

The emulation unit 230 includes an XPS emulator to process an XPS file to be printed, and a PDL emulator to process PDL document data to be printed. The emulation unit 230 reads data containing a variety of settings regarding the XPS file, and checks whether the read data has settings, such as transparency, which require many resources when being processed by the image forming apparatus 200, using a preset tag indicating the transparency setting. Additionally, the emulation unit 230 separates a page with the preset tag from the XPS file, and converts the page with the preset tag into PDL data. These operations of the emulation unit 230 are similar to that of the driver unit 140 of the printing control terminal device 100, so no further description thereof is required.

The control unit 240 controls the XPS file from which the page with the preset tag has been separated, and the PDL data to be printed in the same page order as the original XPS file.

The control unit 240 receives user settings from communication interface unit 210 to determine whether to perform the above-described process. Additionally, the user may determine whether to perform the above-described process during initial setting or after a preset tag is detected. A user may set various printing options to be received by the control unit 240, as described above with regard to control unit 150 of the printing control terminal device 100.

As illustrated in FIG. 3, the image forming apparatus 200 may further include an image forming unit 250 having a printing medium feeding unit to feed a printing medium, a printing unit to print an image according to the processed data on the printing media, and a discharge unit to discharge the media. The image forming unit 250 may be a scanning unit.

As described above with reference to FIGS. 1 to 4, when the preset tag is attached to a page of the XPS file, the page with the preset tag is separated from the XPS file and processed to be printed, however there is no limitation thereto. Accordingly, the present general inventive concept is equally applicable to a situation in which all pages of the XPS file are converted into PDL data that is then transmitted to an image forming apparatus. If one page of an XPS file includes a preset tag, all the XPS files may be converted into PDL data so that there is no need to separate any particular page from the XPS file. Additionally, if every page of an XPS file includes a preset tag, the XPS file as a whole can be converted into PDL data.

According to the exemplary embodiment of the present general inventive concept, the printing control terminal device 100 may include, for example, a personal computer (PC), and an image forming apparatus such as a copier, an inkjet printer, a laser beam printer (LBP) or a multifunctional peripheral (MFP).

Figure 5:
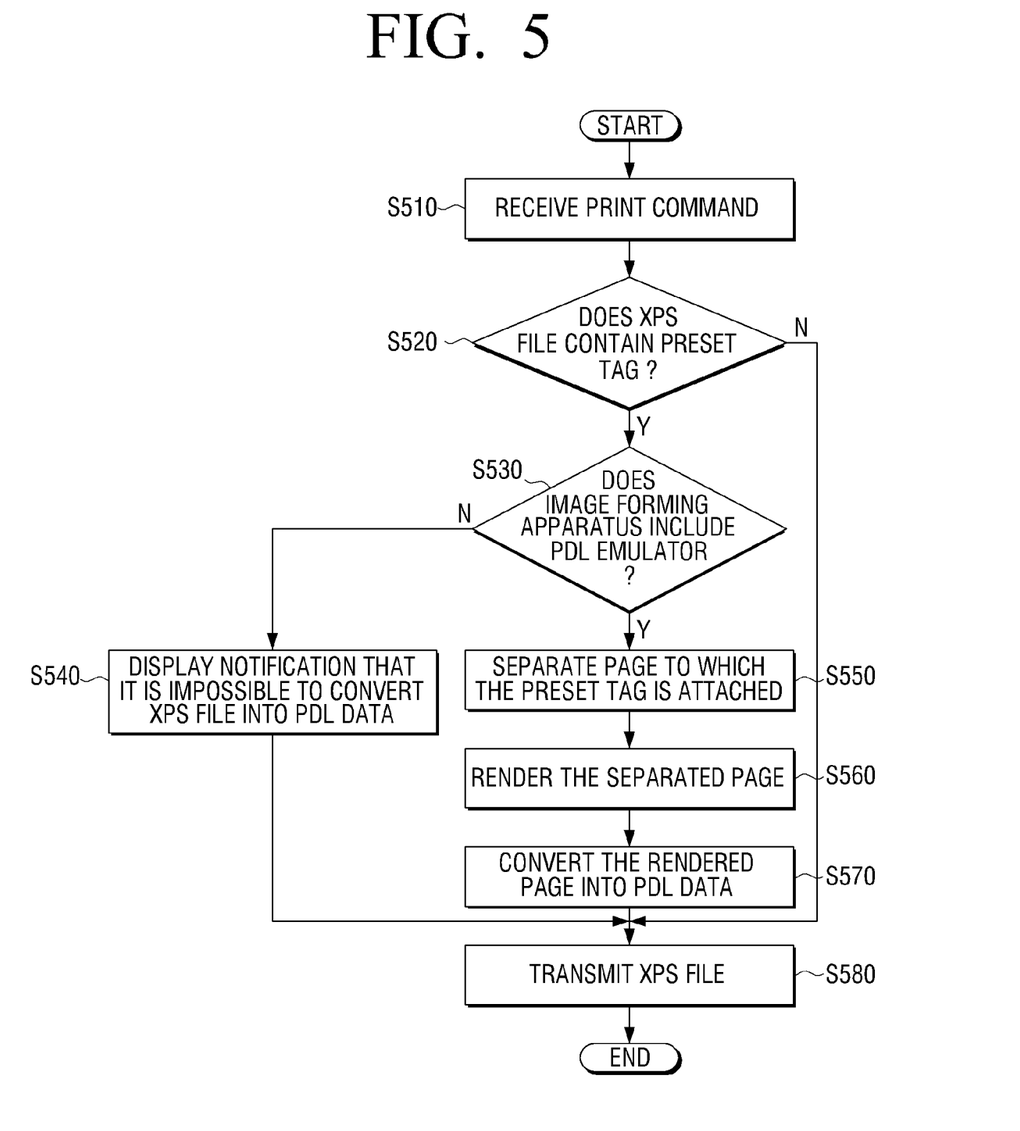
FIG. 5 is a flowchart illustrating a printing control method according to an exemplary embodiment of the present general inventive concept.

FIG. 5 is a flowchart illustrating a printing control method according to an exemplary embodiment of the present general inventive concept.

In FIG. 5, if a print command is received to print an XPS file, to which print options are set and which is represented in the form of a tree having a plurality of levels in operation S510, it is determined in operation S520 whether the XPS file contains a preset tag. Specifically, data containing a variety of settings regarding the XPS file is read, and then the settings are checked to determine whether the read data has settings, such as transparency, which require many resources when being processed by an image forming apparatus.

If it is determined that there is no preset tag in operation S520-N, the XPS file is transmitted to the image forming apparatus to be printed without change in operation S580.

Alternatively, if it is determined that the XPS file contains a preset tag in operation S520-Y, whether the image forming apparatus includes a PDL emulator is determined in operation S530. If it is determined that the image forming apparatus does not include the PDL emulator in operation S530-N, a notification is displayed to inform a user that it is impossible to convert the XPS file into PDL data in operation S540. In this situation, since the PDL emulator is not included in the image forming apparatus, it is not possible to generate PDL data. Accordingly, the user may be provided with a corresponding notification and may decide how to process the XPS file with the preset tag.

Alternatively, if it is determined that the image forming apparatus includes the PDL emulator in operation S530-Y, a page to which the preset tag is attached is separated from the XPS file in operation S550. For example, information obtained after the checking operation may be used to separate the page from the XPS file. Additionally, the preset tag may be removed from the XPS file by deleting data representing the page to which the preset tag is attached, or by additionally setting a print range option for notifying that a page containing the preset tag does not correspond to print data. Furthermore, when the preset tag is attached to a page of the XPS file, all pages of the XPS file may be converted into PDL data that may then be transmitted to the image forming apparatus without the need to separate the page from the XPS file. Additionally, if a preset tag is attached to every page of the XPS file; all pages of the XPS file may be converted into PDL data.

The XPS file from which a page with a preset tag has been separated is divided into a plurality of pieces of data, based on the position of the page in operation S550. Specifically, the XPS file from which the page with the preset tag has been separated may be divided into a plurality of pieces of data, so that the image forming apparatus may print the plurality of pieces of data in the same page order as the original XPS file.

The separated page is rendered in operation S560, and PDL data is generated using the rendered page in operation S570. For example, after rendering the page separated from the XPS file, data corresponding to the rendered page is converted into PDL data, such as PCL data or PS data.

Subsequently, the XPS file from which the page with the preset tag has been separated, and the generated PDL data are transmitted to the image forming apparatus in operation S580. During operation S580, the plurality of pieces of data divided from the XPS file in operation S550, and the PDL data generated in operation S570 may be transmitted in the same order as the original XPS file to the image forming apparatus.

Therefore, the page of the XPS file having a preset tag, for example a setting of transparency, requiring many resources may be converted into PDL data, and the PDL data may then be transmitted to the image forming apparatus. Thus, an image forming apparatus with limited resources may also easily print the XPS file. The printing control method of FIG. 5 may be performed by the printing control terminal device 100 configured as illustrated in FIG. 2 and the image forming apparatus 200 configured as illustrated in FIG. 3, and may also be performed by a printing control terminal device other than the printing control terminal device 100 configured as illustrated in FIG. 2.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, Blu-Ray discs, magnetic tapes, floppy disks, optical data storage devices, and the like. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A printing control method, comprising:
receiving a command to print an XML paper specification (XPS) file;
determining whether at least one page of the XPS file contains a preset tag;
separating the at least one page to which the preset tag is attached from the XPS file if the at least one page of the XPS file contains the preset tag;
converting the at least one separated page into page description language (PDL) data; and
transmitting the XPS file from which the at least one page has been separated and the PDL data to an image forming apparatus,
wherein the preset tag is associated with a transparency setting of the page.

2. The printing control method of claim 1, wherein the preset tag is at least one of "Canvas.OpacityMask", "Path.OpacityMask" and "Glyphs.OpacityMask".

3. The printing control method of claim 1, wherein the determining operation comprises searching for a "FixedPage" data area of the XPS file, and determining whether the "FixedPage" data area contains the preset tag.

4. The printing control method of claim 1, further comprising:
dividing the XPS file from which the page has been separated based on a position of the page.

5. The printing control method of claim 4, wherein the transmitting operation comprises transmitting the divided XPS file and the PDL data to the image forming apparatus in the same page order as the original XPS file.

6. The printing control method of claim 1, further comprising:
asking a user whether to perform the operation of determining whether the XPS file contains the preset tag.

7. The printing control method of claim 1, further comprising:
determining whether the image forming apparatus includes a PDL emulator; and
displaying a corresponding notification if the image forming apparatus does not include the PDL emulator.

8. A printing control terminal device, comprising:
a storage unit to store an XML paper specification (XPS) file;
a user interface unit to receive a command to print the XPS file;
a driver unit to determine whether at least one page of the XPS file contains a preset tag, to separate the at least one page to which the preset tag is attached from the XPS file if the at least one page of the XPS file contains the preset tag, and to convert the at least one separated page into page description language (PDL) data; and
a control unit to transmit the XPS file from which the at least one page has been separated and the PDL data to an image forming apparatus,
wherein the preset tag is associated with a transparency setting of the page.

9. The printing control terminal device of claim 8, wherein the preset tag is at least one of "Canvas.OpacityMask", "Path.OpacityMask" and "Glyphs.OpacityMask".

10. The printing control terminal device of claim 8, wherein the driver unit searches for a "FixedPage" data area of the XPS file, and determines whether the "FixedPage" data area contains the preset tag.

11. The printing control terminal device of claim 8, wherein the driver unit further comprises:
a search unit to determine whether the XPS file contains the preset tag;
a separation unit to separate the page to which the preset tag is attached from the XPS file; and
a PDL generation unit to generate PDL data using the separated page.

12. The printing control terminal device of claim 11, wherein the PDL generation unit renders the separated page and generates PDL data using the rendered page.

13. The printing control terminal device of claim 11, wherein the separation unit divides the XPS file from which the page has been separated based on a position of the page.

14. The printing control terminal device of claim 13, wherein the control unit transmits the divided XPS file and the PDL data to the image forming apparatus in the same page order as the original XPS file.

15. The printing control terminal device of claim 8, wherein the user interface unit asks a user whether to perform the operation of determining whether the XPS file contains the preset tag, and
the driver unit determines whether the XPS file contains the preset tag according to selection by the user.

16. The printing control terminal device of claim 8, further comprising:
a communication interface unit to determine whether the image forming apparatus includes a PDL emulator,
wherein, if the image forming apparatus does not include the PDL emulator, the user interface unit displays a notification of absence of the PDL emulator.

17. An image forming apparatus, comprising:
a communication interface unit to receive an XML paper specification (XPS) file;
an emulation unit to determine whether at least one page of the XPS file contains a preset tag, to separate the at least one page to which the preset tag is attached from the XPS file if the at least one page of the XPS file contains the preset tag, and to convert the at least one separated page into page description language (PDL) data; and
a control unit to print the XPS file from which the at least one page has been separated and the PDL data,
wherein the preset tag is associated with a transparency setting of the page.

18. The image forming apparatus of claim 17, wherein the emulation unit searches for a "FixedPage" data area from the XPS file, and determines whether the "FixedPage" data area contains the preset tag.

19. An image forming apparatus, comprising:
an emulation unit to determine whether at least one page of the XPS file contains a preset tag and to convert at least one page to which a preset tag is attached in an XPS file into PDL data according to the preset tag of the XPS file if the at least one page of the XPS file contains the preset tag; and
a control unit to print the PDL data and the XPS file of which at least one page has been converted into PDL data
wherein the preset tag is associated with a transparency setting of the page.

20. A method, comprising:
determining whether an XML paper specification (XPS) file contains a preset tag;
if the XPS file is determined to contain the preset tag, removing data of the XPS file corresponding to at least one page with the preset tag from the XPS file;
converting the removed data corresponding to the at least one page with the preset tag into page description language (PDL) data; and
transmitting the converted PDL data and a portion of the XPS file without the removed data,
wherein the preset tag is associated with a transparency setting of the page.

21. The method of claim 20, comprising:
transmitting the removed data of the XPS file corresponding to the at least one page and a portion of the XPS file without the removed data sequentially in an order of pages of the XPS file.

22. The method of claim 20, comprising:
dividing the XPS file into a first XPS data corresponding to a first page through a page before the at least one page with the preset tag, and a second XPS data corresponding to a page after the at least one page with the preset tag through a last page, the first XPS data and the second XPS data being included in the portion of the XPS file without the removed data.

23. The method of claim 20, wherein the preset tag indicates that printing the at least one page with the preset tag as XPS data uses greater resources than printing the at least one page with the preset tag as PDL data.

* * * * *